L. J. GRAFFORT & P. L. HOFFMAN.
ICE CREAM DISHER.
APPLICATION FILED APR. 4, 1907.
901,437.
Patented Oct. 20, 1908.
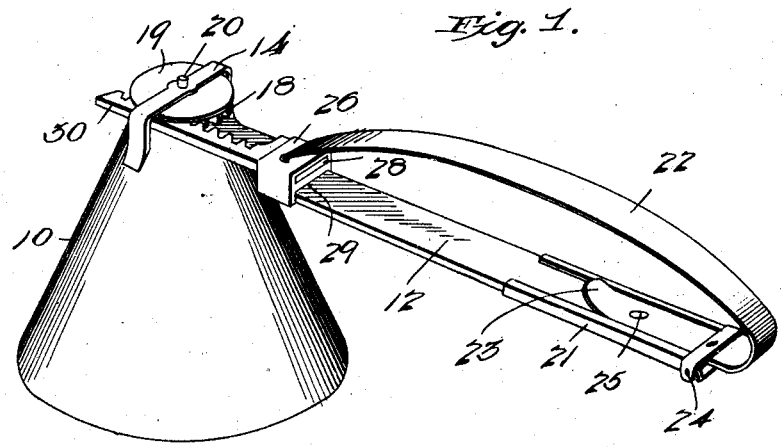
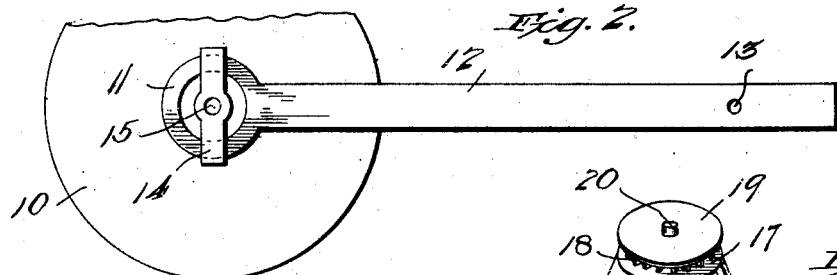
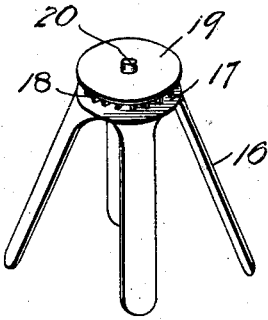
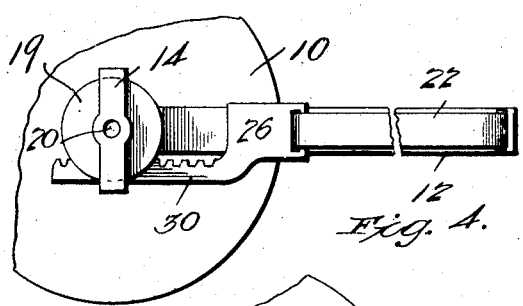
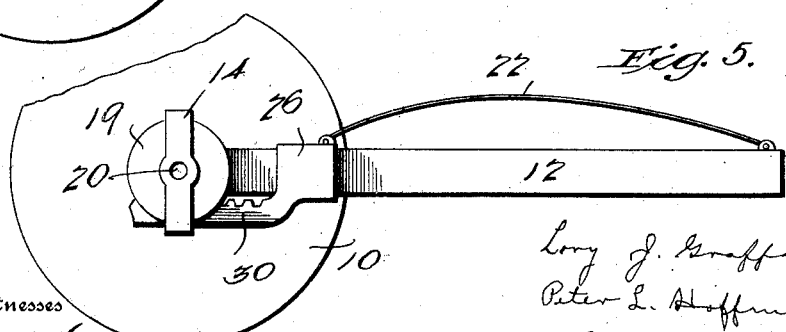

UNITED STATES PATENT OFFICE.

LORY J. GRAFFORT AND PETER L. HOFFMAN, OF NEW CARLISLE, INDIANA.

ICE-CREAM DISHER.

No. 901,437.      Specification of Letters Patent.      Patented Oct. 20, 1908.

Application filed April 4, 1907. Serial No. 366,249.

*To all whom it may concern:*

Be it known that we, LORY J. GRAFFORT and PETER L. HOFFMAN, citizens of the United States, residing at New Carlisle, in the county of St. Joseph and State of Indiana, have invented certain new and useful Improvements in Ice-Cream Dishers, of which the following is a specification.

The present invention consists of certain new and useful improvements in devices for dishing ice cream or other similar material, and has particular relation to that type of dishers in which the material is taken from a freezer or the like, into a vessel or receptacle, usually cone shaped, having thin flat fingers mounted to rotate therein to cause the material to be discharged from the vessel or receptacle when desired.

The principal object of the invention is to provide simple and efficient mechanism for rotating the discharging fingers, such mechanism being so arranged that it can be readily disconnected and the various parts separated, as for instance when it is desired to clean the device.

Other objects of the invention reside in the details of construction and combination of parts described in the following specification, pointed out in the appended claims, and illustrated in the accompanying drawings.

Of the accompanying drawings—Figure 1 is a perspective view of the disher. Fig. 2 is a plan view, the spring, the sheath, slide and rack being removed therefrom. Fig. 3 is a perspective view of the fingers and attached parts. Figs. 4 and 5 are views of modified forms of the invention to be referred to later.

Referring to the annexed drawings, in which like characters of reference designate corresponding parts, 10 designates the vessel or receptacle into which the material is received, said vessel or receptacle being preferably cone-shaped. The upper portion of this vessel or receptacle terminates in a flange 11, from which extends the handle 12.

13 designates an opening that is formed in the handle 12, the particular function of which will be presently described.

14 designates an arched bearing that extends upwardly and across the top of the vessel or receptacle 10, and a circular opening 15 is formed through the center portion thereof.

16 designates the discharging fingers, which, as shown in Fig. 3 of the drawing, are preferably four in number, and are so arranged and formed that when placed within the receptacle 10, they lie snugly against the inner surface thereof, and extend from the top to the bottom. These fingers 16 are preferably formed from one piece of thin metal and have a flat top which forms a seat (17) for a pinion 18, which in turn has mounted thereon a flat disk 19. This disk 19 is of larger diameter than the pinion 18 and its edges therefore project beyond the edges of the pinion. The fingers 16, pinion 18 and disk 19 are held in their relative positions by means of a pivot pin or bolt 20 which extends up from the under portion of the pinion seat 17, through pinion 18 and disk 19, its end being extended and being adapted to be passed through the central opening in the arched bearing 14 when the parts are in their operative position. It will be understood that the parts just referred to, that is, the pinion, pinion seat, disk and bolt, are relatively immovable.

21 designates a sheath that is placed over a portion of the handle 12. This sheath is formed of thin sheet metal, and is bent to a shape corresponding to the shape of the handle 12 upon which it is placed. In the preferred embodiment of our invention the sheath is so formed that there is a space left between its longitudinal edges.

22 designates a flat, bowed spring, one end of which is bent inward, as at 23, and lies along and in the same plane as the sheath 21. A hinge 24 connects this spring to the rear end of the sheath, whereby the parts are securely united without limiting or impairing the elasticity of spring 22. The extreme end of the inwardly bent portion 23 of the spring is bent upwardly slightly to form a gripping portion when it is desired to raise this portion of the spring, and at a slight distance to the rear of this portion of the spring a pin 25 is passed through the spring. The spring 22 extends forwardly from its hinge connection with the sheath 21, and has its forward end hinged to a slide 26.

The slide 26 is mounted upon the handle 12 between the forward end of the sheath and the cone-shaped vessel or receptacle 10. This slide 26 has two longitudinal openings 28, 29, extending through it, the said openings being arranged one above the other. The lower opening 29 is the one through which the handle 12 passes, and is of a size sufficient to permit of the slide being freely reciprocated on said handle. The opening 28 has fast therein one end of a rack 30. This rack 30 extends forwardly and its teeth portion is adapted to engage with the side of the pinion 18 when the parts are in their operative position, as will appear later. The rack may be of any preferred form that will be capable of engaging with the side of the pinion. The form we have illustrated comprises a flat blank portion which is of the same width of the slide 26, and from this blank portion an outwardly curved reduced portion extends at an angle, and from this curved portion extends the portion upon which the teeth are formed. The object of this formation is to have the teeth extend practically parallel with the outer edges of the handle 12.

In assembling the parts, the slide 26 is first placed upon the handle, carrying with it the rack, after which the sheath is slipped over the handle, the bowed spring having been previously connected with the slide and the sheath. As the sheath is being slipped upon the handle, the inwardly bent portion of the spring is raised until the pin 25 carried thereby is directly over the opening 13 in the handle 12. When the pin and opening are in alinement, the raised portion is allowed to drop causing the pin to enter the opening, and thereby hold the sheath and handle relatively immovable. The slide 26 is then retracted, which draws the rack away from the opening in the cone, and then the discharging fingers and its attached pinion, disk and extended bolt or pivot are placed within the vessel or receptacle, the extended portion of the bolt or pivot being passed through the opening in the arched bearing 14. The slide is then released from its retracted position, and the pressure of the spring causes the slide to move the rack to a position where it engages with the pinion. This engagement of the rack and pinion is at the side of the latter and directly beneath the projecting edge of the disk 19, and as the thickness of the material of which the rack is formed is of substantially the same as the distance between top of the cone-shaped vessel or receptacle and the disk, it will be seen that said disk will rest upon the upper side of the rack.

To separate the parts, the slide is retracted, drawing the rack from engagement with the pinion, and from beneath the disk, whereupon the fingers and attached pinion, bolt and disk will drop through the vessel or receptacle 10. The inwardly bent portion of the spring is raised to withdraw its pin from the opening in the handle, and the sheath and slide, with their attached spring and the rack may be slipped from the handle.

From the foregoing description it is thought the operation and advantages of the invention will be apparent. When the parts are in their operative position, the rack extends across the flange 11 inside the arch 14, and the thickness of the rack is such as permits of its being reciprocated between the flange 11 and the projecting edge of the disk 19. By this means the rack supports the discharging fingers within the vessel or receptacle 10. To reciprocate the rack, the spring 22 is pressed down, which through its connection with slide 26, forces the rack forward, and as the teeth of the rack are in engagement with the teeth of the pinion, a rotary movement is imparted to the discharging fingers. When the pressure upon the spring is released, it resumes its normal, or bowed position, which retracts the rack, thereby imparting an opposite rotary movement to the discharging fingers.

In Fig. 4 we have illustrated a modified form of our invention, in which the handle sheath is dispensed with. In this form of the invention, the rear end of the spring is hinged directly to the rear end of the handle. In other respects this form of the invention is similar to the preferred form.

In Fig. 5 we have illustrated a further modification of our invention. In this form the spring is hinged respectively to the side of the slide and to the side of the handle. In every other respect this form is similar to the form illustrated in Fig. 4 of the drawings.

We claim as our invention:—

1. A disher comprising a vessel or receptacle provided with a handle; discharging fingers rotatably supported within said vessel or receptacle; a slide mounted to be longitudinally reciprocated upon said handle, and a rack bar carried by said slide for rotating said discharge fingers.

2. A disher comprising a vessel or receptacle provided with a handle; discharging fingers rotatably mounted within said vessel or receptacle; a slide mounted to be reciprocated longitudinally upon said handle, and a rack bar carried by said slide for both retaining and rotating said discharging fingers within the said vessel or receptacle.

3. A disher comprising a vessel or receptacle provided with a handle, discharging fingers rotatably mounted in said vessel or receptacle, a slide embracing the edges of said handle and free to reciprocate longitudinally thereon, means carried by the slide for rotating said fingers, and means for reciprocating said slide.

4. A disher comprising a receptacle provided with a handle, a rack-bar moving longitudinally upon said handle, a spring connecting said rack-bar and said handle to reciprocate said rack-bar upon compression and release in combination with rotating fingers actuated by said rack-bar.

5. A disher comprising a vessel or receptacle; discharging fingers rotatably mounted in said vessel or receptacle; a handle for the vessel or receptacle; a slide mounted on said handle and adapted to be reciprocated thereon; a sheath carried by the rear end of said handle; a bowed spring having one of its ends connected to said sheath and its other end connected to said slide, and means carried by the said slide for rotating the discharging fingers when the said spring is retracted or expanded to reciprocate the slide.

6. A disher comprising a vessel or receptacle the top of which is open; an arched bearing extending across the top opening of the vessel or receptacle and having a central opening formed therein; a handle for the vessel or receptacle; discharging fingers; an upwardly extending pivot carried by the upper part of said discharging fingers; a pinion and a disk mounted upon said pivot, the disk being provided with edges which extend beyond the edges of said pinion; said discharging fingers being located within the disher or receptacle with the pinion and the disk projected through the top opening and the pivot extending through the opening in the arched bearing; a slide mounted upon said handle; a rack carried by said slide; a sheath mounted upon the rear of the handle and held immovable relatively thereto; a bowed spring connecting said handle and said slide, the relative arrangement and location of the sheath, slide and spring being such that when said spring is retracted or expanded the slide will be reciprocated upon the handle and the rack caused to engage with the pinion inside the arched bearing and beneath the projecting edge of the disk and thereby cause the discharging fingers to rotate and also serving to support the discharging fingers within the said vessel or receptacle.

7. A disher comprising a receptacle with rotating discharging fingers mounted within said receptacle, a handle attached to said receptacle, a rack-bar slidingly attached to said handle and actuating said discharging fingers, and a bow-spring connecting said rack-bar with said handle.

In testimony whereof we affix our signatures, in presence of two witnesses.

LORY J. GRAFFORT.
PETER L. HOFFMAN.

Witnesses:
I. N. VAIL,
S. H. MARTIN.